Dec. 26, 1961     C. H. McDONALD     3,014,392
BAND SAW ATTACHMENT AND METHOD OF COMPLETING CUTOUTS
Filed Oct. 26, 1959

Charles H. McDonald,
*INVENTOR.*

United States Patent Office 3,014,392
Patented Dec. 26, 1961

3,014,392
BAND SAW ATTACHMENT AND METHOD OF COMPLETING CUTOUTS
Charles H. McDonald, 1401 Hermitage Ave., Huntsville, Ala.
Filed Oct. 26, 1959, Ser. No. 848,874
2 Claims. (Cl. 83—14)
(Granted under Title 35, U.S. Code (1952), sec. 266)

The invention described herein may be manufactured and used for or by the Government for governmental purposes without the payment of any royalty thereon.

My invention relates to band saws, and more particularly, to an attachment therefor, for manufacture of pierced products from work specimens, including cutout portions and for interim storage of a plurality of the work specimens and the products and for serial renewal of the workpiece from the work specimens.

Frequently, band saw cutouts are required in a plurality of flat work specimens and such cutouts made on a conventional band saw requires the blade of the saw to be threaded through a hole in the portion to be cut out of each specimen and removed therefrom as each cutout is completed. For each specimen the sawblade is broken, rewelded within the hole, and broken again, for removal of the specimen from the saw. This welding for all of specimens introduces cumulative errors of relignment of the blade to shorten the life thereof. Also, the process is time consuming, since each of the welds is ground to a finish before the blade is operated.

An object of my invention therefore, is to provide a storage attachment for a band saw for production thereon of cutouts in a plurality of specimens with a single break and single weld of the blade of the saw.

Another object of my invention is to provide such an attachment disposed for interim storage of the specimens as the cutouts are completed therein.

Other aims and objects of my invention will appear from the following description.

In carrying out my invention, a power saw is provided with a continuous blade having an exposed portion disposed for cutting operation, and a frame supporting the blade. A pair of containers include trays respectively secured to the frame to enclose the ends of the exposed portion as well as a plurality of cutout work specimens enclosing the blade. The containers are provided with covers disposed for slidable engagement with the trays to retain the specimens therein. The covers are provided with notches for straddling the blade and for removal from the saw and the containers are spaced for serial engagement of the specimens with the exposed portion to complete the cutouts in the specimens.

Figure 1:
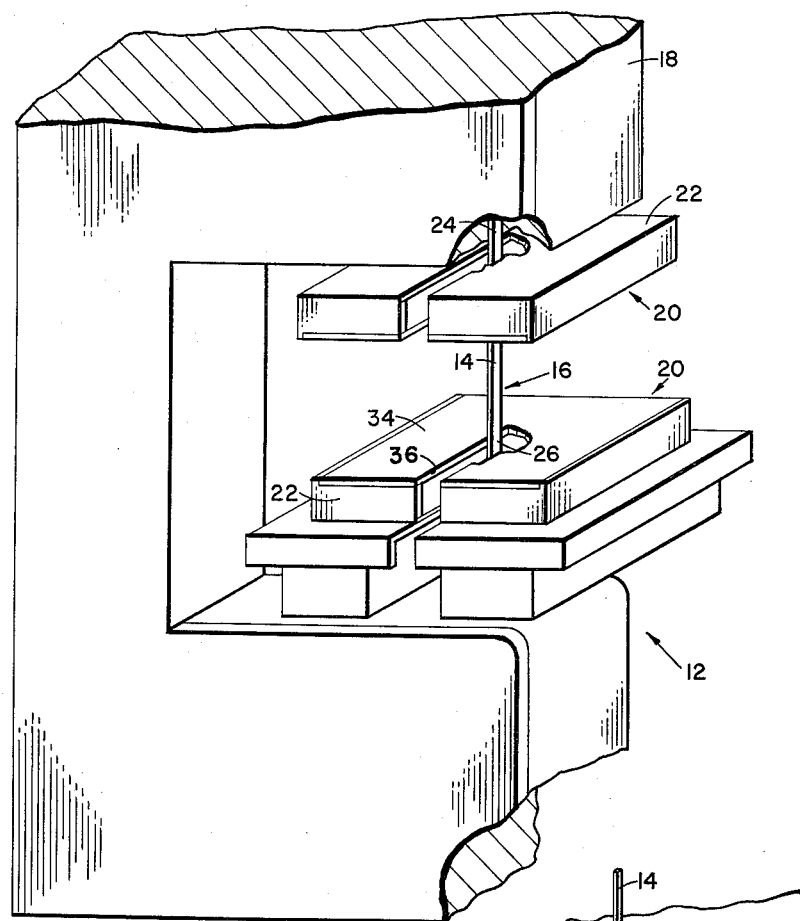
Figure 2:
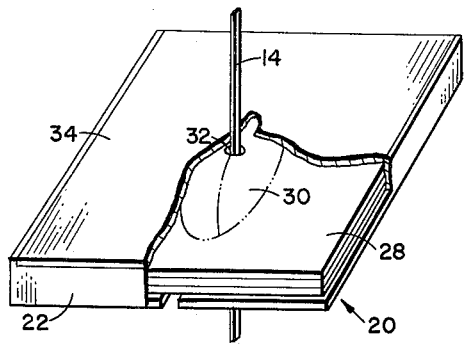

For more complete understanding, reference is directed to the following explanation and the accompanying drawing, in which, FIGURE 1 is a perspective view of one embodiment of my invention; and FIGURE 2 is a partly cut away perspective view of one of the containers enclosing work specimens.

Figure 3:
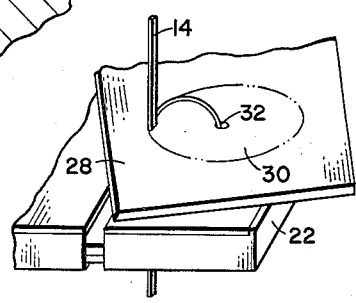

FIGURE 3 is a partial perspective view with a specimen engaging the blade.

Accordingly, a power saw 12 is provided with a blade 14, and a frame 18 supports blade 14 to provide an exposed cutting portion 16 thereof.

A pair of containers 20 respectively include trays 22 secured to frame 18, in mutually facing relationship to enclose ends 24 and 26 of exposed portion 16. Containers 20 are further disposed to straddle a plurality of work specimens 28 provided with portions 30 to be cut out. Holes 32 in portions 30 enclose exposed portion 16.

Containers 20 are provided with covers 34 disposed for slidable engagement with trays 22 to retain specimens 28 therein and the covers are provided with notches 36 for straddling blade 14 and for removal therefrom.

Containers 20 are spaced for serial engagement of the specimens with exposed portion 16 for completion of the cutouts therein. The covers are disposed for slidable manipulation of the specimens thereover during the serial engagement.

*Operation*

A plurality of work specimens having portions to be cut are pierced to provide holes in the cutout portions. The blade of the saw is broken, threaded through the holes, for transfixed relation with the plurality of work specimens and the ends of the blade are rewelded and ground to provide a finished joint in the blade. The specimens are stored in one of the containers and serially manipulated in slidable engagement with one of the covers for engagement with the exposed portion and completion of the cutouts in the specimens.

Upon completion of the respective cutouts each of the specimens is stored in the other of the containers. When all of the specimens are stored the blade is rebroken for removal of the specimens from the saw.

While the foregoing is a description of the preferred embodiment, the following claims are intended to include those modifications and variations that are within the spirit and scope of my invention.

I claim:
1. A band saw for manufacture of pierced products from work specimens including cutout portions, comprising: a frame; a continuous blade supportably disposed thereon to provide said blade with an exposed portion for transfixed relation thereof with the cutout portions of a plurality of the work specimens and selective cutting engagement of the exposed portion with the work specimens for removal therefrom of the cutout portions; and a device secured to said frame for respective storage of the work specimens and products during the cutting engagement including a pair of containers including notched trays respectively secured to said frame straddle to the ends of said exposed portion and disposed to respectively enclose the work specimens and the products; and covers disposed for slidable engagement with the respective trays in mutually facing relation to retain the specimens in said trays and provided with notches for straddling the exposed portion and for slidable removal therefrom; said containers being spaced to accommodate the cutting operation therebetween; and one of said covers being disposed for slidable engagement of the specimens therewith during the completion of the cutting operation.

2. The method of completing cutouts in a plurality of work specimens on a power saw including a continuous blade, a frame disposed to support the blade and provide a portion thereof exposed for cutting operation, a pair of notched trays spacedly secured to the frame for respective straddling of the opposite ends of the exposed portion of the blade and of the plurality of specimens, and covers respectively disposed in mutually facing relationship for slidable engagement with the trays for retention of the specimens therein and notched for removal from the saw; comprising the steps of piercing the plurality of specimens in the portions thereof to be cut out to provide holes; breaking the blade and threading the blade through the holes; welding the ends of the blade together and finishing the weld; storing the plurality of specimens in one of the containers and closing said one container with the cover thereof; serially manipulating each of the specimens to slidable engagement with one of the covers and into engagement with the exposed portion of the blade for completion of the cutouts in the specimens; securing each of the specimens in the other of the containers upon the completion of the respective cutouts; and rebreaking the blade for removal of the plurality of specimens from the saw.

References Cited in the file of this patent

UNITED STATES PATENTS

| | | |
|---|---|---|
| 1,376,410 | Diskin | May 3, 1921 |
| 2,566,551 | Boice | Sept. 4, 1951 |